United States Patent
Shen et al.

(10) Patent No.: US 10,783,802 B2
(45) Date of Patent: Sep. 22, 2020

(54) LIP GLOSS GUIDE DEVICE AND METHOD THEREOF

(71) Applicant: CAL-COMP BIG DATA, INC., New Taipei (TW)

(72) Inventors: Shyh-Yong Shen, New Taipei (TW); Min-Chang Chi, New Taipei (TW); Cheng-Hsuan Tsai, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 358 days.

(21) Appl. No.: 15/623,394

(22) Filed: Jun. 15, 2017

(65) Prior Publication Data

US 2018/0315336 A1  Nov. 1, 2018

(30) Foreign Application Priority Data

Apr. 27, 2017 (CN) .......................... 2017 1 0289141

(51) Int. Cl.
*G09B 19/00* (2006.01)
*A45D 44/00* (2006.01)
(Continued)

(52) U.S. Cl.
CPC ........... *G09B 19/00* (2013.01); *A45D 44/005* (2013.01); *G06K 9/00281* (2013.01);
(Continued)

(58) Field of Classification Search
CPC ............. A45D 44/005; G06K 9/00281; G06K 9/00671; G09B 19/00; G06T 11/40; G06T 11/60; G08B 5/02
(Continued)

(56) References Cited

U.S. PATENT DOCUMENTS 6,545,650 B1 * 4/2003 Yamada ............. G02B 27/0093
345/7
7,537,573 B2 * 5/2009 Horst ................... A61H 1/0237
482/5
(Continued)

FOREIGN PATENT DOCUMENTS

EP  1975870     10/2008
EP  1975870 A1 * 10/2008 ............. G06T 11/00
(Continued)

OTHER PUBLICATIONS

Dong Guo et al., "Digital Face Makeup by Example", IEEE Computer Society Conference on Computer Vision and Pattern Recognition, Jan. 1, 2009, pp. 1-7.
(Continued)

*Primary Examiner* — Xuan M Thai
*Assistant Examiner* — Sadaruz Zaman
(74) *Attorney, Agent, or Firm* — JCIPRNET

(57) ABSTRACT

A lip gloss guide device including an image capturing unit, a processing unit and a display unit is provided to guide a user to draw a lip gloss. The image capturing unit captures a face image of the user, where the face image at least includes a lip of the user. The processing unit receives the face image, and acquires a plurality of lip feature points according to the face image. The processing unit performs calculation according to the lip feature points and a predetermined angle of an upper lip peak to obtain an upper lip gloss guide block. The display unit displays the face image and the upper lip gloss guide block, and guides a user to put on makeup to the upper lip gloss guide block. The disclosure further provides a lip gloss guide method adapted to the lip gloss guide device.

8 Claims, 4 Drawing Sheets

(51) Int. Cl.
*G06K 9/00* (2006.01)
*G06T 11/60* (2006.01)
*G06T 11/40* (2006.01)
*G09B 5/02* (2006.01)
*G06F 3/0482* (2013.01)

(52) U.S. Cl.
CPC .......... *G06K 9/00671* (2013.01); *G06T 11/40* (2013.01); *G06T 11/60* (2013.01); *G09B 5/02* (2013.01); *A45D 2044/007* (2013.01); *G06F 3/0482* (2013.01)

(58) Field of Classification Search
USPC ........................................................ 434/100
See application file for complete search history.

(56) References Cited

U.S. PATENT DOCUMENTS

| | | | | |
|---|---|---|---|---|
| 8,155,479 | B2* | 4/2012 | Hoffman | A61B 1/00039 |
| | | | | 382/276 |
| 9,256,069 | B2* | 2/2016 | Wada | G02B 27/0093 |
| 2004/0155834 | A1* | 8/2004 | Wit | G09G 3/001 |
| | | | | 345/7 |
| 2005/0131857 | A1* | 6/2005 | Fujiki | G06F 3/0481 |
| 2005/0237485 | A1* | 10/2005 | Blum | G02C 7/08 |
| | | | | 351/159.4 |
| 2006/0017657 | A1* | 1/2006 | Yamasaki | G02B 27/017 |
| | | | | 345/8 |
| 2006/0061544 | A1* | 3/2006 | Min | G02B 27/0093 |
| | | | | 345/156 |
| 2007/0132663 | A1* | 6/2007 | Iba | G06F 3/013 |
| | | | | 345/8 |
| 2009/0115865 | A1* | 5/2009 | Kamada | H04N 5/232 |
| | | | | 348/222.1 |
| 2009/0139536 | A1* | 6/2009 | Yano | A45D 44/005 |
| | | | | 132/200 |
| 2009/0217315 | A1* | 8/2009 | Malik | G06K 9/00362 |
| | | | | 725/9 |
| 2009/0295812 | A1* | 12/2009 | Aoki | G06F 16/9577 |
| | | | | 345/522 |
| 2010/0188415 | A1* | 7/2010 | Pettigrew | H04N 1/622 |
| | | | | 345/589 |
| 2011/0007132 | A1* | 1/2011 | Redmann | G03B 35/18 |
| | | | | 348/42 |
| 2011/0149098 | A1* | 6/2011 | Ahn | H04N 5/232 |
| | | | | 348/222.1 |
| 2012/0019670 | A1* | 1/2012 | Chang | H04N 9/3147 |
| | | | | 348/189 |
| 2012/0081554 | A1* | 4/2012 | Berman | H04N 5/91 |
| | | | | 348/207.1 |
| 2012/0223956 | A1 | 9/2012 | Saito et al. | |
| 2013/0169827 | A1 | 7/2013 | Santos et al. | |
| 2014/0161507 | A1 | 6/2014 | Wong | |
| 2014/0174463 | A1 | 6/2014 | Wong | |
| 2015/0262403 | A1 | 9/2015 | Yamanashi | |
| 2016/0125227 | A1* | 5/2016 | Soare | G06K 9/00248 |
| | | | | 382/118 |
| 2016/0253713 | A1 | 9/2016 | Aarabi | |

FOREIGN PATENT DOCUMENTS

| | | |
|---|---|---|
| EP | 2988486 | 2/2016 |
| JP | 2012113747 | 6/2012 |
| KR | 20070087555 | 8/2007 |

OTHER PUBLICATIONS

Eriko Iwabuchi et al., "Smart Makeup Mirror: Computer-Augmented Mirror to Aid Makeup Application", Lecture Notes in Computer Science, Jul. 19, 2009, pp. 495-503.
"Search Report of Europe Counterpart Application", dated Feb. 9, 2018, p. 1-p. 6, in which the listed references were cited.
"Office Action of Korea Counterpart Application" with English translation thereof, dated Apr. 13, 2020, p. 1-p. 8.

\* cited by examiner

LIP GLOSS GUIDE DEVICE AND METHOD THEREOF

CROSS-REFERENCE TO RELATED APPLICATION

This application claims the priority benefit of China application serial no. 201710289141.3, filed on Apr. 27, 2017. The entirety of the above-mentioned patent application is hereby incorporated by reference herein and made a part of this specification.

BACKGROUND OF THE INVENTION

Field of the Invention

The disclosure relates to a facial feature recognition technique, and particularly relates to a lip gloss guide device based on lip shape recognition and a method thereof.

Description of Related Art

The love of beauty is woman's nature, and many women will add facial features through makeup. However, the skill of makeup is not innate, and a makeup effect can be improved after a number of cosmetic practises.

If someone wants to learn a makeup skill, the learner may learn it from images on the Internet. However, the makeup skill learned through images may have a deviation in practice. Therefore, how to learn the makeup skill through modern equipment is a technical issue concerned by manufacturers.

SUMMARY OF THE INVENTION

The disclosure is directed to a lip gloss guide device and a lip gloss guide method, where an upper lip gloss guide block is calculated and displayed according to a face image of a user, such that the user is able to put on makeup according to a prompt provided by the lip gloss guide device, so as to provide convenient interactive makeup teaching.

The disclosure provides a lip gloss guide device including an image capturing unit, a processing unit and a display unit. The image capturing unit captures a face image of a user, where the face image at least includes a lip of the user. The processing unit receives the face image, and acquires a plurality of lip feature points according to the face image. The processing unit performs calculation according to the lip feature points and a predetermined angle of an upper lip peak to obtain an upper lip gloss guide block. The display unit displays the face image and the upper lip gloss guide block, and guides a user to put on makeup to the upper lip gloss guide block.

The disclosure provides a lip gloss guide method, which includes following steps. A face image of a user is obtained, the face image is received, and a plurality of lip feature points is acquired according to the face image. Calculation is performed according to the lip feature points and a predetermined angle of an upper lip peak to obtain an upper lip gloss guide block, and the user face image and the corresponding upper lip gloss guide block are displayed, and a user is guided to put on makeup to the upper lip gloss guide block, where the face image at least includes a lip of the user.

According to the above description, the lip gloss guide device and the lip gloss guide method of the disclosure may calculate and display the upper lip gloss guide block according to the face image of the user, such that the user learns an area to be put on a lip gloss, and the user clearly knows how to acquire different lip shapes through different lip gloss put-on positions. In this way, even the user is not familiar with makeup, the user may still put on the lip gloss according to the prompt provided by the lip gloss guide device, so as to provide convenient interactive makeup teaching.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
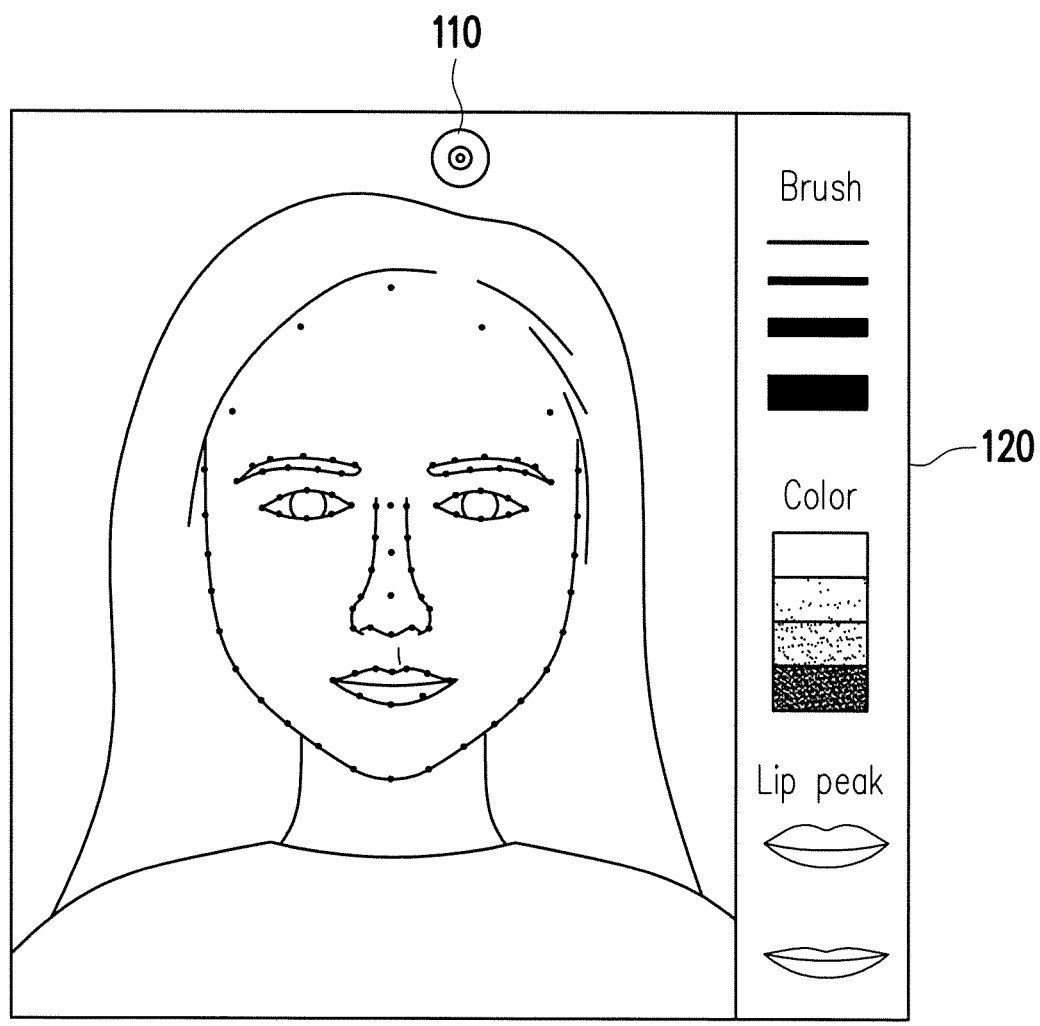
FIG. 1 is a schematic diagram of a display interface of a lip gloss guide device according to an embodiment of the disclosure.
Figure 2:
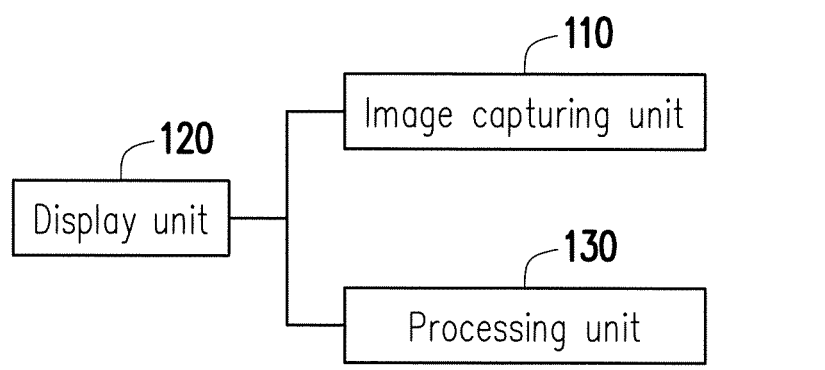
FIG. 2 is a system block diagram of a lip gloss guide device according to an embodiment of the disclosure.

FIG. 1 is a schematic diagram of a display interface of a lip gloss guide device according to an embodiment of the disclosure, and FIG. 2 is a system block diagram of a lip gloss guide device according to an embodiment of the disclosure. Referring to FIG. 1 and FIG. 2, in the present embodiment, the lip gloss guide device 100 includes an image capturing unit 110, a multimedia display unit 120 and a processing unit 130.

The image capturing unit 110 is used for capturing a face image of a user, particularly a lip image of the user. The image capturing unit 110 is, for example, an embedded video camera, an external mobile phone, an external camera connected to the display unit 120 and the processing unit 130 in a wired or wireless manner, which is not limited by the disclosure.

The display unit 120 may display multimedia information and the face image in real-time. For example, the display unit 120 displays the lip image of the user and provides options of a plurality of lip shapes and lip glosses to the user for selecting by users. In the present exemplary embodiment, the display unit 120 can be a display disposed behind a material with a high reflectivity (for example, a mirror) and combined with an organic light-emitting diode (OLED). In this way, the user may view her own face through the mirror, and the display unit 120 may display related information on the mirror for the user to view and for touch selection, though the disclosure is not limited thereto. The lip gloss guide device 100 of the present embodiment can be a device disposed on a makeup table, and a screen 140 of the lip gloss guide device 100 can be disposed behind the mirror, and a text or an image displayed thereon may pass through the mirror for the user to view. In other embodiments, the lip gloss guide device 100 can also be a consumable electronic product such as a smart phone, a tablet PC, etc., or a portable mirror box combined with a portable mirror.

The processing unit 130 performs a calculation according to the face image of the user captured by the image capturing unit 110, so as to acquire a plurality of lip feature points of the user related to a lip profile of the user. For example, in an implementation of the present exemplary embodiment, the processing unit 130 can be a central processing unit (CPU), a microprocessor, an application specific integrated circuits (ASIC), a programmable logic device (PLD) or other similar devices. The processing unit 130 is configured to run various necessary software programs and/or instruction sets for providing an upper lip gloss guide block. In the present exemplary embodiment, the processing unit 130 runs a face detection system using a Dlib face landmark to detect and analyze 194 face feature points of the user's face. In other cases, the face feature points of the user can be acquired by only analyzing 119 face feature points of the user's face or use other algorithms for detecting the face feature points.

In the present embodiment, when the user faces the mirror to put on a makeup, the display unit 120 may display the face image and the lip image of the user, and analyze the face feature points in real-time. In order to provide the convenient interactive lip gloss guide device, in the disclosure, the display unit 120 further displays the upper lip gloss guide block based on a lip position of the user to prompt a position and a manner to the user for drawing the lip gloss. In this way, the user may draw the lip gloss at the corresponding position of the lip on the user's face according to guidance of the upper lip gloss guide block displayed by the display unit 120. Moreover, in the present embodiment, the display unit 120 particularly adjusts the lip feature points according to an upper lip peak and a width ratio of an upper lip of the user, so as to guide the user to draw the lip gloss on different curves to present different lip shapes. A display way of the upper lip gloss guide block is to display a frame line around the upper lip. However, the display method of the upper lip gloss guide block is not limited by the disclosure, and in other embodiments, the display way of the upper lip gloss guide block is to directly take the upper lip of the user as a reference to adjust an upper lip display block, and take the adjusted upper lip display block of the user as the upper lip gloss guide block.

Figure 3:
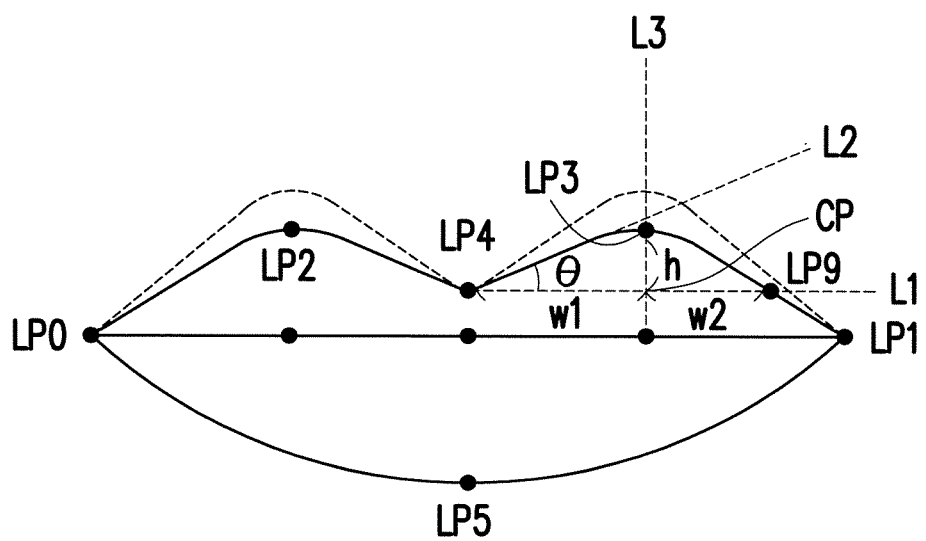
FIG. 3 is a schematic diagram of an upper lip gloss guide block according to an exemplary embodiment of the disclosure.

Referring to FIG. 3, FIG. 3 is a schematic diagram of an upper lip gloss guide block according to an exemplary embodiment of the disclosure. After the image capturing unit 110 captures the face image of the user, the processing unit 130 obtains a plurality of the lip feature points of the user according to the face image of the user. The lip feature points of the user obtained by the processing unit 130 at least include lip corners LP0, LP1, upper lip peaks LP2, LP3, an upper lip valley LP4 and a lower lip peak LP5.

The lip feature points of the user obtained by the processing unit 130 is not limited thereto, and in other embodiments, the number of the face feature points obtained by the processing unit 130 can be 119, 194, etc., where the number of the lip feature points is, for example, 43. For example, in the implementation of 119 face feature points, the processing unit 130 may number each of the face feature points, for example, to number all of the face feature points by 0-118, where the lip feature points have numbers 58-100. Moreover, the lip corners LP0, LP1 located at two sides respectively have a number 58 and a number 100, the upper lip peaks LP2, LP3 respectively have a number 63 and a number 66, the upper lip valley LP4 has a number 64, and the lower lip peak LP5 has a number 78. However, the disclosure is not limited thereto.

After the lip feature points are obtained, the processing unit 130 may adjust positions of the upper lip peaks LP2, LP3 and the upper lip valley LP4 according to the positions of the lip feature points and a lip shape to be selected by the user, and takes a block formed by the adjusted lip feature points as the upper lip gloss guide block A1, so as to display different lip shapes.

To be specific, different lip shapes selected by the user may correspond to different predetermine angles of the upper lip peaks, so that the lip shapes have different curves. Moreover, the different lip shapes selected by the user may correspond to different upper lip width ratio. Therefore, when the user selects different lip shapes, the processing unit 130 may calculate an angle of the upper lip peaks and the upper lip width ratio, and adjust the lip feature points to obtain the upper lip gloss guide block A1. The method that the processing unit 130 calculates the angle of the upper lip peaks and the upper lip width ratio is described in detail below.

Taking a right side of the lip as an example, a first horizontal line L1 is a straight line horizontally passing through the upper lip valley LP4, i.e. a straight line along an x-axis direction in a coordinate plane. The first horizontal line L1 further passes through a first lip feature point LP9 on a lip profile. A second straight line L2 is a straight line passing through the right upper lip peak LP3 and the upper lip valley LP4. Namely, the first horizontal line L1 and the second straight line L2 all pass through the upper lip valley LP4 and are intersected at the upper lip valley LP4. Moreover, a third vertical line L3 is a straight line passing through the right upper lip peak LP3 and perpendicular to the first horizontal line L1, and the third vertical line L3 and the first horizontal line L1 have a first intersection CP. The angle of the upper lip peaks to be calculated in the present embodiment is an included angle $\theta$ between the first horizontal line L1 and the second straight line L2. Moreover, the processing unit 130 may adjust the lip feature points to make the included angle $\theta$ to be complied with a predetermined angle of the upper lip peaks.

It should be noted that the first horizontal line L1, the second straight line L2 and the third vertical line L3 mentioned in the present embodiment are only used as an example. In an actual implementation, the processing unit 130 is unnecessary to actually indicate or calculate the actual lines. In another embodiment, the processing unit 130 may perform in the calculation of the disclosure only according to the coordinates of the lip feature points. For example, when the intersection CP needs to be obtained, the intersection CP of the first horizontal line L1 and the third vertical line L3 can be obtained only according to an x-coordinate of the right upper lip peak LP3 in a coordinate plane and a y-coordinate of the upper lip valley LP4 in the coordinate plane, and following operations can be accordingly executed. The way of obtaining the intersection CP according to the coordinates can be deduced by those skilled in the art according to usual acknowledge of coordinate plane and trigonometric function, which is not repeated.

During a process that the processing unit 130 performs calculation according to the lip feature points of the user and the predetermined angle of the upper lip peaks to obtain the upper lip gloss guide block, the processing unit 130 may first determine whether the included angle $\theta$ is complied with the predetermined angle of the upper lip peaks. For example, the processing unit 130 may calculate a first horizontal distance w1 between the upper lip valley LP4 and the first intersection CP and a vertical distance h between the right upper lip peak LP3 and the intersection CP. Based on a definition of tan θ, the included angle θ, the first horizontal distance w1 and the vertical distance h can be represented in a following equation:

$$\tan\theta = \frac{h}{w1} \quad (1)$$

Since the first horizontal distance w1 and the vertical distance h are all calculated data, the processing unit 130 may accordingly deduce an actual value of the included angle θ. Then, the processing unit 130 may determine whether the included angle θ is complied with the predetermined of the upper lip peaks. In the present embodiment, if the included angle θ is not complied with the predetermined of the upper lip peaks, the processing unit 130 may adjust positions of the right upper lip peak LP3 and the lip feature points between the right upper lip peak LP3 and the right lip corner LP1 in the vertical direction, so as to obtain the upper lip gloss guide block A1.

In detail, based on the definition of tan θ, the included angle θ, the first horizontal distance w1 and the vertical distance h can be adjusted as follows:

$$H = \tan\theta = w1 \quad (2)$$

The processing unit 130 may take the first horizontal distance w1 as a reference to calculate the vertical distance H under the predetermined angle. Moreover, the processing unit 130 further adjusts a vertical position of the right upper lip peak LP3 according to the calculated vertical distance H, such that the vertical distance h is the same to the vertical distance H calculated under the predetermined angle, such that the included angle θ is complied with the predetermined angle.

For example, in the situation of that the included angle θ is greater than the predetermined angle, when the processing unit 130 calculate the vertical distance H according to the equation (2), the vertical distance H calculated according to the equation (2) is smaller than the actual vertical distance h. Therefore, the processing unit 130 moves down a vertical position (i.e. a position in the y-axis direction) of the right upper lip peak LP3 to decrease the vertical distance h. In this way, the value of the included angle θ is decreased to comply with the predetermined angle. Conversely, in the situation of that the included angle θ is smaller than the predetermined angle, the processing unit 130 moves up the vertical position of the right upper lip peak LP3 to increase the vertical distance h. In this way, the value of the included angle θ is increased to comply with the predetermined angle. After the vertical distance h is adjusted, the processing unit 130 may correspondingly adjust the lip feature points between the upper lip valley LP4 and the right lip corner LP1 to obtain the upper lip gloss guide block A1.

It should be noted that the predetermined angle of the present embodiment is 10 degrees since such predetermined angle is regarded as an optimal upper lip peak angle acknowledged by practitioners of current medical cosmetology. The disclosure is not limited thereto, and the predetermined angle can be correspondingly changed according to a lip shape selected by the user. The user may also adjust the predetermined angle according to her own needs and a makeup selection.

In another embodiment, when the included angle θ is greater than the predetermined angle, the processing unit 130 may also take the position of the right upper lip peak LP3 as a reference to move up the position of the upper lip valley LP4, such that the included angle θ is decreased. Alternatively, when the included angle θ is smaller than the predetermined angle, the processing unit 130 may take the position of the right upper lip peak LP3 as a reference to move down the position of the upper lip valley LP4, such that the included angle θ is decreased.

It should be noted that during the process of adjusting the right upper lip peak LP3, a thickness/height of the upper lip is changed. Therefore, the processing unit 130 may also properly translate the positions of the right upper lip peak LP3 and the upper lip valley LP4 upward or downward at the same time in a same proportion according to the positions of the adjusted right upper lip peak LP3 and the upper lip valley LP4. However, the disclosure is not limited thereto.

In other embodiments, if the processing unit 130 determines that the included angle θ between the first horizontal line L1 and the second straight line L2 is not complied with the predetermined angle, the processing unit 130 may also adjust the position of the right upper lip peak LP3 in the horizontal direction.

In detail, based on the definition of tan θ, the included angle θ, the first horizontal distance w1 and the vertical distance h can be adjusted as follows:

$$W1 = \frac{h}{\tan\theta} \quad (3)$$

Therefore, the processing unit 130 may take the vertical distance h as a reference to calculate the first horizontal distance W1 under the predetermined angle, and adjusts the horizontal position of the right upper lip peak LP3 according to the calculated first horizontal distance W1, such that the included angle θ is complied with the predetermined angle.

For example, in the situation of that the included angle θ is greater than the predetermined angle, when the processing unit 130 calculate the first horizontal distance W1 according to the equation (3), the first horizontal distance W1 calculated according to the equation (3) is greater than the actual first horizontal distance w1. Therefore, the processing unit 130 may shift the horizontal position (i.e. the position in the x-axis direction) of the right upper lip peak LP3 to the right, such that the first horizontal distance w1 is increased. In this way, the value of the included angle θ is decreased to comply with the predetermined angle. Conversely, in the situation of that the included angle θ is smaller than the predetermined angle, the processing unit 130 may shift the horizontal position of the right upper lip peak LP3 to the left, such that the first horizontal distance w1 is decreased. In this way, the value of the included angle θ is increased to comply with the predetermined angle.

Besides that the positions of the upper lip peaks LP2 and LP3 are adjusted to make the included angle θ to be complied with the predetermined angle, in the present embodiment, the processing unit 130 may calculate an upper lip width ratio to accordingly adjust the relative positions of the upper lip peaks LP2, LP3 and the lip corners LP0, LP1 to obtain the upper lip gloss guide block A1.

To be specific, the processing unit 130 may further determine whether a ratio between the first horizontal distance w1 and the second horizontal distance w2 is complied with a width predetermined ratio. For example, the width predetermined ratio of the present embodiment is the ratio between the first horizontal distance w1 and the second horizontal distance w2 of 1:1, and in other embodiment, the user may adjust the width predetermined ratio according to an actual requirement.

If the ratio between the first horizontal distance w1 and the second horizontal distance w2 is not complied with 1:1, the processing unit 130 may selectively adjust the horizontal positions (i.e. x-coordinates) of the right upper lip peak LP3, the upper lip valley LP4 and the right lip corner LP1, such that the ratio between the first horizontal distance w1 and the second horizontal distance w2 is changed to 1:1 for complying with the width predetermined ratio. For example, when the ratio between the first horizontal distance w1 and the second horizontal distance w2 is 1:2, the processing unit 130 may shift the horizontal position of the right upper lip peak LP3 to the left, such that the ratio between the first horizontal distance w1 and the second horizontal distance w2 is complied with 1:1. Conversely, when the ratio between the first horizontal distance w1 and the second horizontal distance w2 is 2:1, the processing unit 130 may shift the horizontal position of the right upper lip peak LP3 to the right, such that the ratio between the first horizontal distance w1 and the second horizontal distance w2 is complied with 1:1.

It should be noted that during the process of adjusting the lip feature points according to the first horizontal distance w1, the second horizontal distance w2 and the vertical distance h to obtain the upper lip gloss guide block A1 complied with the predetermined angle and the width predetermined ratio, since the included angle θ is probably changed during such process, the processing unit 130 may repeatedly execute the operation of adjusting the lip feature points according to the horizontal distance and the vertical distance h to obtain the upper lip gloss guide block A1 complied with the predetermined angle and the width predetermined ratio.

After the upper lip gloss guide block A1 complied with the predetermined angle and the width predetermined ratio is calculated and obtained, the processing unit 130 may instructs the display unit 130 to display the upper lip gloss guide block A1 and a user image in the display unit 130.

It should be noted that in other embodiments of the disclosure, the processing unit 130 may further calculate a height ratio of the upper lip and a lower lip of the user to accordingly adjust the lip feature points. However, the method of calculating and adjusting the height ratio of the upper lip and the lower lip is not limited by the disclosure.

Figure 4:
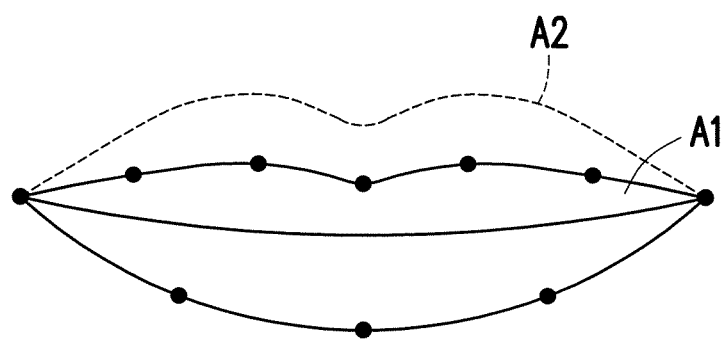
FIG. 4 is a schematic diagram of a second upper lip gloss guide block according to an embodiment of the disclosure.

Moreover, referring to FIG. 4, FIG. 4 is a schematic diagram of a second upper lip gloss guide block according to an embodiment of the disclosure. In an embodiment of the disclosure, when the upper lip gloss guide block A1 is smaller than an actual lip block of the user, the processing unit 130 further instructs the display unit 120 to display a second upper lip gloss guide block A2 located between the user lip block and the upper lip gloss guide block A1. In this way, the user may draw a decorative lip gloss or concealer on the lip at a position corresponding to the second upper lip gloss guide block A2, such that the user may accurately draw the desired lip shape.

Figure 5:
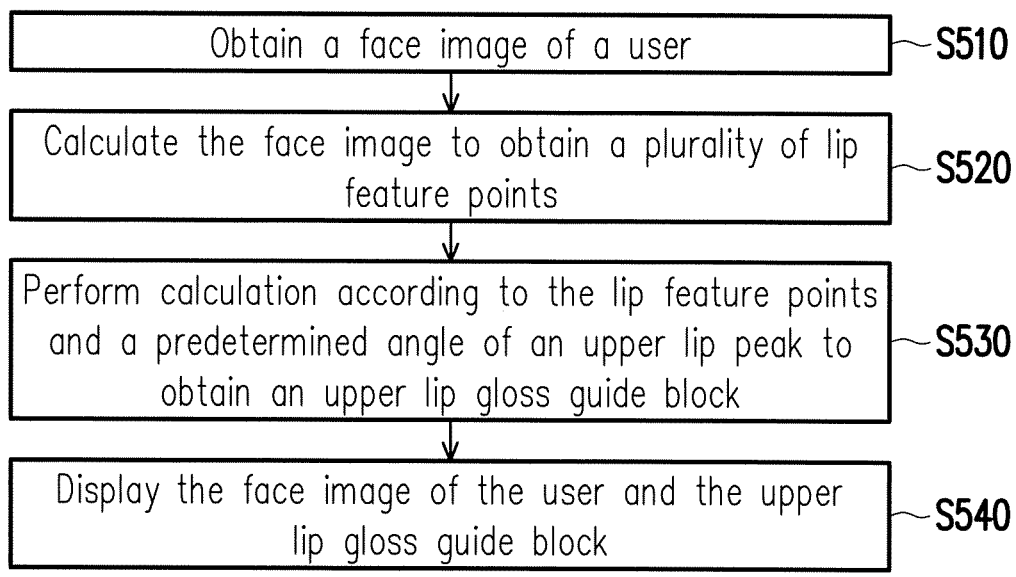
FIG. 5 is a flowchart illustrating a lip gloss guide method according to an embodiment of the disclosure.

Referring to FIG. 5, FIG. 5 is a flowchart illustrating a lip gloss guide method according to an embodiment of the disclosure. Referring to FIG. 2 and FIG. 5, when the user wants to use the lip gloss guide device 100 to provide a guidance for drawing the lip gloss, first, in step S510, the image capturing unit 110 captures a face image of the user, and transmits the captured face image of the user to the processing unit 130. The face image includes a lip image of the user. Then, in step S520, the processing unit 130 calculates the captured face image to obtain a plurality of lip feature points. Moreover, in step S530, the processing unit 130 performs calculation according to the lip feature points and a predetermined angle of an upper lip peak to obtain an upper lip gloss guide block. Finally, the processing unit 130 transmits the face image acquired by the image capturing unit 110 and the upper lip gloss guide block A1 calculated by the processing unit 130 to the display unit 120, and in step S540, the processing unit 130 instructs the display unit 120 to display the face image of the user and the upper lip gloss guide block A1.

It should be noted that in the present embodiment, since the lip gloss guide method is to obtain the face image and calculate the upper lip gloss guide block A1 in a real-time manner, the step S510 to the step S540 are repeatedly executed until the user stops the operation.

Moreover, the lip gloss guide method of the present exemplary embodiment may adjust a pattern of the upper lip gloss guide block according to user's selection, for example, to adjust the predetermined angle and the width predetermined ratio according to different upper lip curves selected by the user. Moreover, the user may also select a color, a texture of the lip gloss in the display unit 120, and previews the same in the display unit 120. In other exemplary embodiments, the processing unit 130 may finely adjust the upper lip gloss guide block according to the color and the texture selected by the user, and display the same in the display unit 120.

Figure 6:
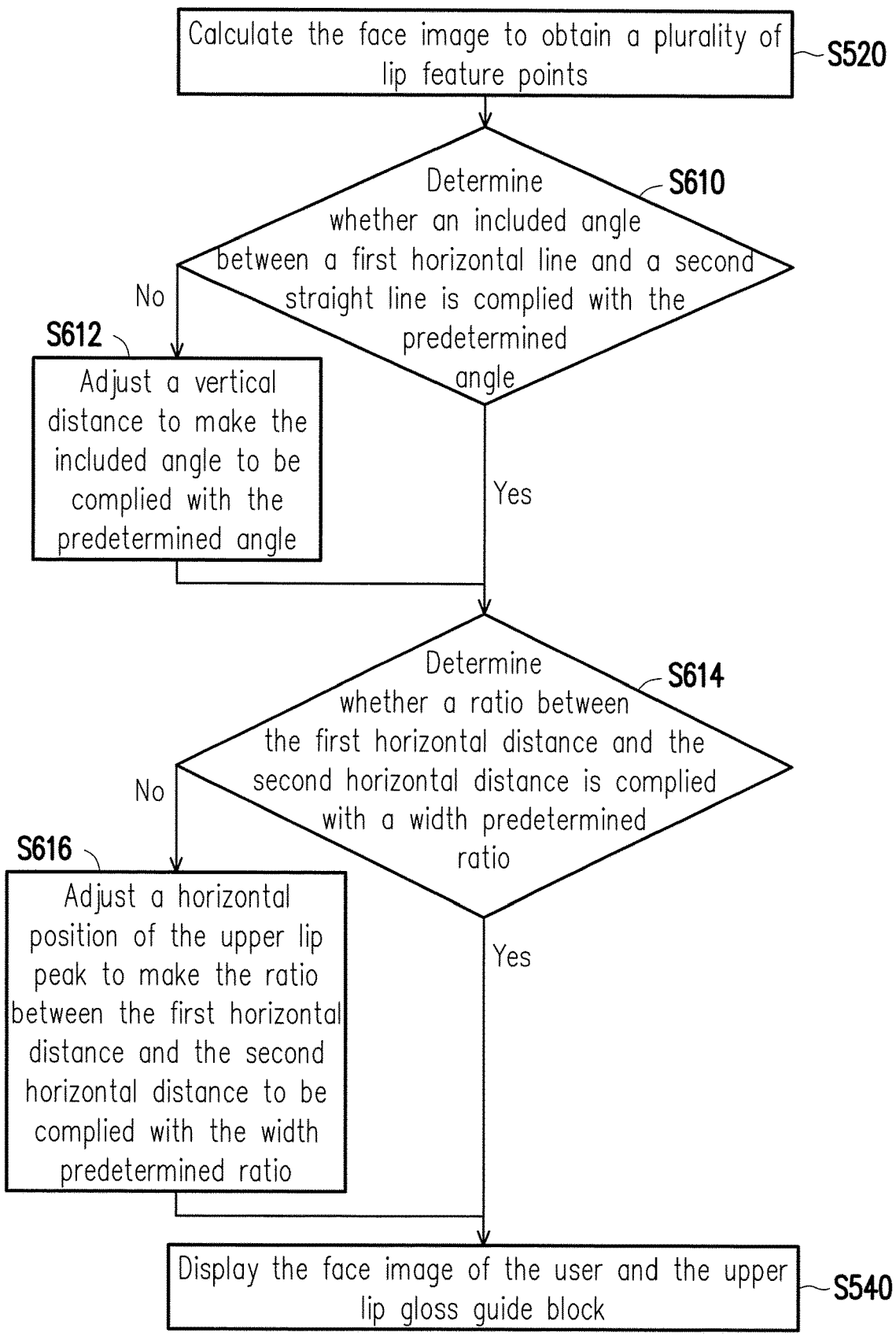
FIG. 6 is a detailed flow of obtaining an upper lip gloss guide block according to an embodiment of the disclosure.

FIG. 6 is a detailed flow of obtaining the upper lip gloss guide block according to an embodiment of the disclosure. Referring to FIG. 3 and FIG. 6, taking a right lip as an example, in the present embodiment, when the step S530 is executed, i.e. when the processing unit 130 performs calculation according to the lip feature points and the predetermined angle of the upper lip peak to obtain the upper lip gloss guide block A1, a step S610 is first executed, by which the processing unit 130 determines whether an included angle θ between a first horizontal line and a second straight line is complied with the predetermined angle. The methods for calculating the included angle θ and determining whether the included angle θ is complied with the predetermined angle have been described in detail in the embodiment of FIG. 3, and details thereof are not repeated.

Then, in step S612, when the included angle θ is not complied with the predetermined angle, the processing unit 130 may adjust the vertical distance h to make the included angle θ to be complied with the predetermined angle. For example, the processing unit 130 may take the upper lip valley LP4 or the upper lip peak LP3 as a reference to adjust the vertical distance h. The detailed adjusting method has been described in the embodiment of FIG. 3, and detail thereof is not repeated.

After the step S612 of adjusting the included angle θ is executed, or in the step S610, the processing 130 determines that the included angle θ is complied with the predetermined angle, and it is unnecessary to adjust the included angle θ, and the processing unit 130 executes a step S614 to determine whether a ratio between the first horizontal distance w1 and the second horizontal distance w2 is complied with a width predetermined ratio. If the ratio between the first horizontal distance w1 and the second horizontal distance w2 is not complied with the width predetermined ratio, in step S616, the processing unit 130 may adjust a horizontal position of the upper lip peak LP3 to make the ratio between the first horizontal distance w1 and the second horizontal distance w2 to be complied with the width predetermined ratio. The detail adjusting method has been described in the embodiment of FIG. 3, and detail thereof is not repeated.

After the step S616 is executed, i.e. the horizontal position of the upper lip peak LP3 is adjusted to make the ratio between the first horizontal distance w1 and the second horizontal distance w2 to be complied with the width predetermined ratio, or in the step S614, the processing unit 130 determines that the first horizontal distance w1 and the second horizontal distance w2 is complied with the width predetermined ratio, and it is unnecessary to adjust the first horizontal distance w1 and the second horizontal distance w2, the step S540 is executed, by which the processing unit 130 instructs the display unit 120 to display the face image and the upper lip gloss guide block A1.

Since during the process of adjusting the lip feature points according to the first horizontal distance w1, the second horizontal distance w2 and the vertical distance h to obtain the upper lip gloss guide block A1, the included angle θ is accordingly changed during such process, the steps S610 to S616 are repeatedly executed to obtain the upper lip gloss guide block A1 complied with the predetermined angle and the width predetermined ratio.

Through the flows of FIG. 5 and FIG. 6, the processing unit 130 may calculate the upper lip gloss guide block A1. Therefore, the user may view the calculated upper lip gloss guide block A1 through the display unit 120, and draw the lip gloss on the face at a position corresponding to the upper lip gloss guide block A1.

In summary, the lip gloss guide device and the lip gloss guide method of the disclosure may calculate and display the upper lip gloss guide block according to the face image of the user, such that the user learns an area to be put on the lip gloss, and the user clearly knows how to acquire different lip shapes through different lip gloss put-on positions. In this way, even the user is not familiar with makeup, the user may still put on the lip gloss according to the prompt provided by the lip gloss guide device, so as to provide convenient interactive makeup teaching.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A lip gloss guide device, comprising:
   an image sensor, configured to capture a face image of a user, wherein the face image at least comprises a lip of the user;
   a processor, configured to:
      receive the face image,
      obtain a plurality of lip feature points according to the face image, wherein the lip feature points at least comprise lip corners, an upper lip peak, an upper lip valley and a lower lip peak, a straight line horizontally passing through the upper lip valley is a first horizontal line, a straight line vertically passing through the upper lip peak is a third vertical line, the first horizontal line and a profile of the lip are intersected at a first lip feature point, and the first horizontal line and the third vertical line form a first intersection, and
      adjust the lip feature points according to a predetermined angle of the upper lip peak and a width predetermined ratio so as to obtain an upper lip gloss guide block, wherein the lip feature points forming the upper lip gloss guide block are complied with that:
         the processor adjusts a horizontal distance of the upper lip peak such that the ratio between a first horizontal distance and a second horizontal distance is complied with the width predetermined ratio, wherein the first horizontal distance is a distance between the upper lip valley and the intersection, and the second horizontal distance is a distance between the first intersection and the first lip feature point; and
   a display, configured to display the face image and the corresponding upper lip gloss guide block, and guide the user to put on makeup according to the upper lip gloss guide block.

2. The lip gloss guide device as claimed in claim 1, wherein a straight line passing through the upper lip peak and the upper lip valley is a second straight line,
   wherein when the processor adjusts the lip feature points according to the predetermined angle of the upper lip peak and the width predetermined ratio so as to obtain the upper lip gloss guide block, the processor further calculates an included angle between the first horizontal line and the second straight line, and determines whether the included angle is complied with the predetermined angle,
   when the included angle is not complied with the predetermined angle, the processor adjusts vertical positions of the lip feature points to make the included angle to be complied with the predetermined angle, so as to obtain the upper lip gloss guide block.

3. The lip gloss guide device as claimed in claim 2, wherein the processor calculates the included angle between the first horizontal line and the second straight line according to a vertical distance between the upper lip peak and the first intersection and the first horizontal distance between the upper lip valley and the first intersection.

4. The lip gloss guide device as claimed in claim 1, wherein the predetermined angle is 10 degrees.

5. The lip gloss guide device as claimed in claim 1, wherein the width predetermined ratio is the ratio between the first horizontal distance and the second horizontal distance of 1:1.

6. A lip gloss guide method, comprising:
   obtaining a face image of a user, wherein the face image at least comprises a lip of the user;
   receiving the face image, acquiring and a plurality of lip feature points according to the face image, wherein the lip feature points at least comprise lip corners, an upper lip peak, an upper lip valley and a lower lip peak, a straight line horizontally passing through the upper lip valley is a first horizontal line, a straight line vertically passing through the upper lip peak is a third vertical line, the first horizontal line and a profile of the lip are intersected at a first lip feature point, and the first horizontal line and the third vertical line form a first intersection;
   adjusting the lip feature points according to a predetermined angle of the upper lip peak and a width predetermined ratio so as to obtain an upper lip gloss guide block, wherein the lip feature points forming the upper lip gloss guide block are complied with that:
      adjusting a horizontal distance of the upper lip peak such that the ratio between a first horizontal distance and a second horizontal distance is complied with the width predetermined ratio, wherein the first horizontal distance is a distance between the upper lip valley and the intersection, and the second horizontal distance is a distance between the first intersection and the first lip feature point; and displaying the user face image and the corresponding upper lip gloss guide block, and guiding the user to put on makeup according to the upper lip gloss guide block.

7. The lip gloss guide method as claimed in claim 6, wherein a straight line passing through the upper lip peak and the upper lip valley is a second straight line, and the step of adjusting the lip feature points according to the predetermined angle of the upper lip peak and the width predetermined ratio so as to obtain the upper lip gloss guide block comprises:

calculating an included angle between the first horizontal line and the second straight line;

determining whether the included angle is complied with the predetermined angle; and adjusting vertical positions of the lip feature points to make the included angle to be complied with the predetermined angle when the included angle is not complied with the predetermined angle, so as to obtain the upper lip gloss guide block.

8. The lip gloss guide method as claimed in claim 7, wherein the step of determining whether the included angle is complied with the predetermined angle comprises:

calculating the included angle according to a vertical distance between the upper lip peak and the first intersection and the first horizontal distance between the upper lip valley and the first intersection.

* * * * *